Figure 1:
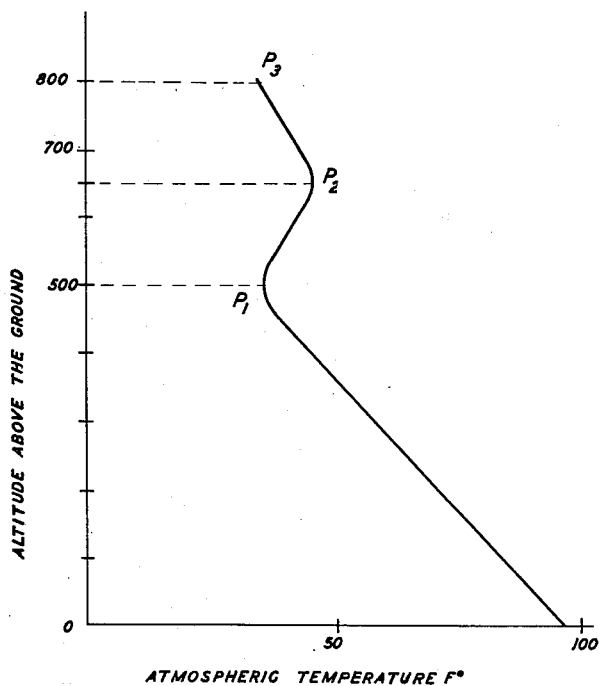

INVENTOR
G. W. GILMAN
BY
E. V. Griggs
ATTORNEY

Patented Aug. 12, 1952

2,606,443

UNITED STATES PATENT OFFICE 2,606,443

EXPLORATION OF TROPOSPHERE STRATIFICATION

George W. Gilman, Summit, N. J., assignor to Bell Telephone Laboratories, Incorporated, New York, N. Y., a corporation of New York Application June 14, 1946, Serial No. 676,611

4 Claims. (Cl. 73—170)

This invention relates to methods and systems for ascertaining atmospheric conditions and particularly for determining heights and thicknesses of layers, strata or discontinuities in the atmosphere.

The invention is based on the discovery that compressional wave reflections may be obtained from discontinuities in the atmosphere in sufficient magnitude so that their intensity and time incidence may be measured at a point having a definite relation to the location of the source of the compressional wave. Hitherto the open space of the atmosphere generally has been deemed to be a substantially completely absorbing system or "sink" for sound waves and, in fact, the dissipation of sound has been specified in terms of the area of the open windows through which it might escape. It is not at all strange that the idea of non-reflectiveness should be associated with the atmosphere since, for the most part, any discontinuities tend to be quickly eliminated by air currents and the rapid propogation of barometric pressure changes tends to conceal the fact that other characteristics such as temperature, moisture content, and capacity may experience rather steep gradients in restricted areas which in some instances constitute rather sharply defined zones.

Among devices which previously have been used for exploring atmospheric conditions several merit special mention. One of the earliest is the free balloon. Such devices have been allowed to escape and their height at the moment of disappearance has been measured by triangulation. The information obtained from balloons is merely the height of the ceiling of visibility and the direction and velocity of air currents. Another expedient is to use an airplane with an observer to note atmospheric conditions aloft and to report to the ground by radio. This expedient is expensive, slow and of limited application since it cannot be used with safety for murky conditions at low altitudes. Finally, there is the radiosonde which is perhaps the most satisfactory instrument at present available but which is relatively expensive and not adapted to give a continuous indication in one region since radiosondes necessarily drift with wind currents and are subject to limitations as to power and operating life.

In accordance with the present invention a compressional wave transmitter with a horn or other directive compressional propagation device is positioned to send a vertical beam toward the sky. At a location in the shadow of the horn so as to be unaffected by the direct beam is a compressional wave receiver also vertically directive. A calibrated indicator preferably of the visual type is connected to both the transmitter and the receiver so as to respond when energy is being transmitted from the transmitter and also to reflected energy picked up by the receiver. The indicator yields an indication of the time elapsing between emission of the outgoing beam pulse and receipt of the reflected pulse. This time is a measurement of the height of the discontinuity at which the reflection occurs.

Figure 2:
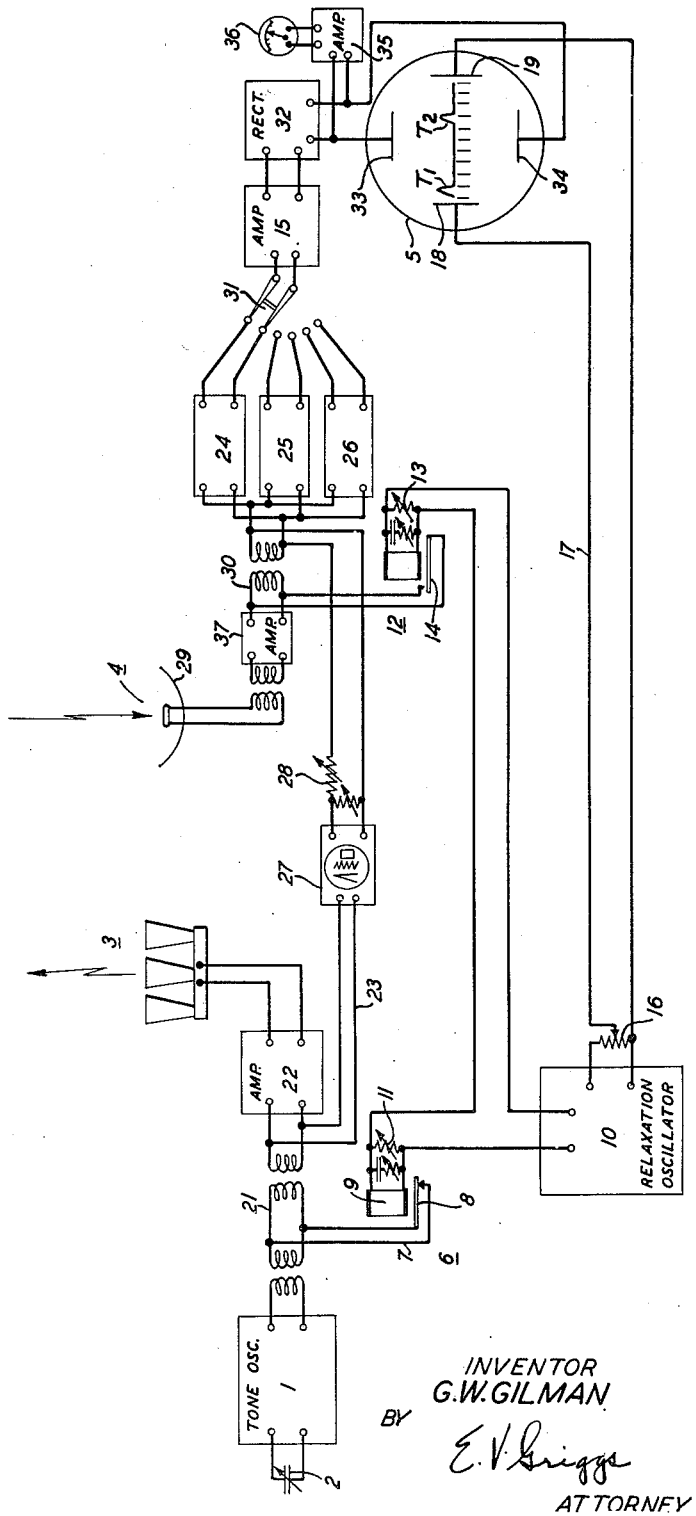

In the drawing, Fig. 1 presents a height temperature diagram of the atmosphere and Fig. 2, one embodiment of a system capable of operation in accordance with the invention.

Referring to Fig. 1, conditions of atmospheric temperature are shown for varying height above the earth under a particular set of atmospheric conditions. The temperature is at a maximum at the ground surface and diminishes steadily with increased height up to a point $P_1$ marking the lower margin of a zone in which the atmospheric conditions are different. From $P_1$ the temperature rises to a point $P_2$ well in the zone after which it diminishes as the upper boundary $P_3$ of the upper zone is approached. It is at such temperature discontinuities as that at $P_1$ that warmer moisture-bearing layers coming into contact with cooler atmospheric regions immediately beneath may tend to precipitate their moisture as fog or rain. The change in temperature, moisture content and density gives rise to a variation in the propagation characteristics for compressional waves and occasions a compressional wave discontinuity at which incidence of compressional waves engenders reflections.

Referring to Fig. 2, a compressional wave transmitting system is shown comprising a variable frequency electrical oscillator 1 provided with a tuning means 2 such as a variable condenser to enable variation of the oscillation frequency. The oscillator 1 is connected to the battery of loudspeakers 3 which converts electrical oscillations to compressional waves and directs them vertically upward toward the sky and the moisture-filled strata 20 such as may exist in the regions between points $P_1$ and $P_3$ of Fig. 1. The loudspeakers emit a directive beam of compressional waves largely confined to a vertical direction and casts a shadow in the region of the compressional wave pick-up device 4 which is preferably located ten feet or more from the transmitter to reduce any incidental pick-up therefrom. The pick-up device 4 which may be an electrodynamic apparatus serves a purpose which is the converse of that of the device 3 and converts compressional wave energy received from a source which is vertically above to electrical wave energy. The input circuit of the loudspeakers 3 and the output circuit of the receiver 4 are both connected to the cathode ray oscillograph indicator 5 so that the times of the respective direct and reflected pulses may be indicated on the oscillograph screen as pips $T_1$ and $T_2$. In order to determine the length of the outgoing pulse of waves of the upwardly directed beam there is introduced into the input circuit of the loudspeakers 3, pulser or controller 6 which serves to initiate and terminate the pulse of the loudspeaker. The pulser 6 comprises a normally short-circuited shunt path 7, across a circuit interposed between tone oscillator 1 and loudspeakers 3, in which is a normally closed armature 8 of a relay winding 9 connected in series in the space current circuit of a relaxation oscillator 10 of any well-known type as, for example, that disclosed at Fig. 7, page 19 of the book entitled "Time Bases" by O. S. Puckle, published by Chapman and Hall, London, 1943. In shunt with the relay winding is a variable resistor condenser combination 11 to control the sensitiveness and elapsed time of the relay operate interval and hence the pulse length as well as the initial start time of the relay. The relaxation oscillator may have the usual controls both for determining the frequency of its pulse and for determining their intensity.

The space current circuit of the relaxation oscillator also includes a second relay winding 12 shunted by variable sensitivity adjusting resistor condenser combination 13 and having a normally open circuit armature 14 in a shunt path across the receiving circuit connected to the pick-up device 4. The purpose of the relay 12, 14 is to short-circuit the receiver so as to protect elements of the receiving circuit and particularly the amplifier 15 from overload by energy of the outgoing pulse from loudspeakers 3 which may finds its way to the pick-up device 4 directly from the loudspeakers 3 without traversing the echo path to and from the zone 20. Since it is desired to have the receiving system protected or "blanked out" over a period exceeding the duration of the outgoing pulse from loudspeakers 3 the relay 12 may be so designed and adjusted as to operate on less current and to hold on less current than the relay 9. It is also desirable to insure that the relay 12 may operate earlier than relay 9 so as to anticipate the outgoing pulse and this may normally be effected by any device which makes the relay 9 slow to operate. Ordinarily, however, this expedient is unnecessary since a physical separation of the device 3 and the device 4 by as much as 40 feet will give a 40 millisecond advantage to the relay 12 which is adequate to have the receiving circuit short-circuited in advance of the arrival at pick-up 4 of sound energy from loudspeakers 3.

The saw-tooth wave output electromotive force of the relaxation oscillator 10 may be impressed by a potentiometer 16 over the path 17 to the deflecting electrodes 18 and 19 of the oscilloscope 5 so as to cause the sweep of the oscilloscope beam to begin with the initiation of the compressional wave pulse or at any desired point with respect to the pulse in the well-known manner in which that same function is accomplished with various apparatus including the electromagnetic echo system known as radar.

The transmitter oscillator may be designed to produce oscillations of the order of 1000 cycles, 2000 cycles or 4000 cycles or, in fact, any other frequency or combination of frequencies within the range extending up from a few hundred cycles. It may extend into the supersonic frequency range. The output of the oscillator is passed through the pulsing or control section 21 to an amplifier 22 and may be augmented to a desired power before being impressed upon the battery of loudspeakers.

In order to provide a positive marking pulse which shall produce the zero time indication on the oscilloscope screen represented by pip $T_1$ and corresponding to the initiation of the upward pulse from the loudspeakers 3 a path 23 is connected from the input circuit of amplifier 22 to the input circuit of the band filters 24, 25 and 26 of the receiver. Included in the path 23 is an asymmetric device 27 and a variable attenuation pad 28 to prevent reaction of received energy upon the transmitter and to enable amplitude adjustment of the pip $T_1$.

The receiving system includes the pick-up device 4 which is preferably highly directive in its response so as effectively to respond to downwardly directed compressional wave pulses but to be insensitive or non-responsive to compressional wave energy received from other directions. This directive characteristic may be enhanced by the use of a paraboloidal reflector 29 positioned to have its focus at the pick-up device and its open end extending vertically upward.

The pick-up device is associated through a coupling circuit 30, across which the terminals of the blanking relay armature and its contact are connected, with the input of the preamplifier 31 the output of which is connected to a group of parallel band filters 24, 25 and 26. Filter 24 may be designed to select oscillations in a narrow band in the region of 1000 cycles, filter 25, a narrow band in the 2000 cycle region and filter 26 a narrow band in the 4000 cycle region. A manually operable double pole selector switch 31 may connect the outputs of any of the three filters to amplifier 15 as desired. Connected to the output of amplifier 15 is a rectifier 32 which applies the marking pulses to the deflector plate electrodes 33 and 34 of the oscilloscope 5.

From the time elapsed between pips $T_1$ and $T_2$, as measured by the oscilloscope horizontal scale it is possible to read the height of the reflecting discontinuity. The scale may be calibrated in compressional wave echo distance. The velocity of compressional waves is not an invariable but is a function of the atmospheric conditions. However, the variation of propagation velocity is not sufficiently great to introduce large error in the results particularly since the discontinuity is not a single sharply defined plane or surface but rather a congeries of closely spaced atmospheric striations.

In practice a pulse of length 0.07 second has been found satisfactory with a recurrence interval of approximately two seconds. It is to be understood that the adjustment features of relay 9 permit the pulse length to be varied and that the recurrence period may be controlled as desired by variation of the controls of the relaxation oscillator 10. The amplifier 22 may be designed to deliver an output power of the order of 50 watts. The paraboloid 4 of the receiver in the system used was 24 inches in diameter and about 8 inches in depth. It was found effective when located about 30 feet from the loudspeakers.

The frequency of the oscillations employed has a bearing on the indication since for very low frequencies and hence for very long wavelengths a discontinuity in the form of a relatively thin layer may be fairly transparent whereas for a high frequency have a wavelength of the same order as the thickness of the discontinuity a marked reflection may be obtained. It is accordingly desirable to begin with lower frequency waves, noting any reflection or discontinuity heights. Having found such a reflection the pitch frequency oscillation of the outgoing pulse may now be lowered until a frequency is reached at which the reflection is negligible. This gives an indication of the thickness of the stratum or the atmospheric layer which lies beyond the discontinuity. Thereafter one may increase the frequency by steps to develop additional reflections. In this manner it may be possible not only to determine positions of each discontinuity but also to ascertain the thickness of the layer or stratum beyond the reflection region. If, for example, a reflection is found at a particular wavelength and the wavelength be increased sufficiently to cause the reflection to disappear it reasonably may be concluded that the layer which occasions the discontinuity has a thickness which is small compared with the final wavelength.

Where more elaborate systems are justified a plurality of such units as that shown in Fig. 2 may be utilized. It will be appreciated that one considerable advantage of this compressional wave apparatus resides in the instantaneous indications or records which it provides of the conditions over an upwardly extending path in the troposphere. This advantage may be multiplied by the use of a plurality of these compressional wave units each operating on its own individual compressional wave frequency different from the others so as to obtain simultaneous records of the transmission of each of the different frequency components. It should be understood that in this instance as in all other embodiments of the invention, the electronic oscilloscope 5 of Fig. 2 may be replaced by any of the well-known types of recording oscillographs.

As an alternative the pulse of compressional waves transmitted by a single unit transmitter may be rich in harmonics and of square topped wave form. The receiving circuit may be adjusted for very wide band reception so as to enable the returning echo to be picked up and indicated with fidelity. Changes in the wave form and the duration of the echo pulse will be significant as to the thickness and nature of the strata which give rise to the discontinuities in the troposphere. A series of vertically separated thin strata, for example, will give rise to a prolonged echo. The relative amplitude of the returning pulse is also significant since with transmitted pulses of predetermined amplitude the intensity of the echo pulse is a function of the magnitude of the discontinuity and will be large when there is an abrupt change from one compressional wave transmission condition to a different one and will be small where the transition from one condition to another is gradual. In this manner, it is possible to examine the stratifications of the atmosphere above the earth without recourse to more cumbersome airborne apparatus.

Although both audible and supersonic waves are useful in the operation of this invention there is a certain advantage in the ordinary situation in the use of audio frequency energy because of the fact that the attenuation experienced by high supersonic frequency energy is considerably greater. To an extent this is offset by the increased directivity which may be had for supersonic frequency energy with compressional wave radiators of not too great dimensions. With increase in relative humidity the attenuation at higher frequencies rises very rapidly and this fact may be turned to use to determine relative humidity by observation of the relative attenuations at increasing frequencies.

The intensity of the reflected energy may be measured by the height of pip $T_2$ in well-known manner but, if desired, an amplifier 35 in tandem with an indicator 36 may be connected in shunt to the input of the cathode ray oscillograph 5.

It will be appreciated that the method and the system of the invention provide a facility for attaining inexpensively results which are of a continuous character and yet are applicable to a definite positional zone in the sky in a manner not possible with the entire resources of the prior art.

What is claimed is:

1. The method of ascertaining stratification conditions in the earth's atmosphere which comprises transmitting upwardly directed pulses of compressional waves of a predetermined frequency, directively receiving echoes from overhead, filtering from said echoes components of other than a relatively narrow band including the predetermined frequency and measuring the time interval between the transmitted pulse and the receipt of the echo.

2. A system for measuring the height of a horizontal boundary between two different atmospheric strata which comprises a compressional wave transmitter directed to transmit a beam of compressional waves toward the sky, means for varying the frequency of said waves, a directional compressional wave receiver spaced therefrom and positioned relatively remote from the transmitted beam, and directed so as to receive only compressional waves reflected from atmospheric discontinuities and coming from the direction of the sky, means for filtering from said reflected waves components of said waves other than those lying in a relatively narrow band including the frequency of said compressional wave transmitter and means for measuring the time interval which elapses between the beam transmission and the receipt of an echo from the sky.

3. The method of measuring the thickness of a stratified layer in the atmosphere which comprises obtaining an echo from said layer by means of an exploring beam of compressional waves of sufficiently short wavelength to be reflected by said layer, increasing the wavelength of the exploring beam until no material echo is received from said layer, and determining the wavelength of the exploring beam which is just sufficient to cause the echo to substantially disappear.

4. The method of exploring the atmosphere which comprises transmitting an exploring beam of compressional waves of a relatively long wavelength, decreasing the wavelength of the exploring beam until a first reflection is received from a first stratum in the atmosphere, increasing the wavelength of the exploring beam until such first reflection substantially disappears, determining the wavelength at which such disappearance occurs, decreasing the wavelength of the exploring beam below the value at which said first reflection occurred until a reflection is received from a second stratum less thick than said first stratum, increasing the wavelength of the exploring beam again until said second reflection substantially disappears and determining the wavelength at which said latter disappearance occurs.

GEORGE W. GILMAN.

REFERENCES CITED

The following references are of record in the file of this patent:

UNITED STATES PATENTS

| Number | Name | Date |
|---|---|---|
| 2,275,735 | Cloud | Mar. 10, 1940 |
| 2,333,688 | Sheppard | Nov. 9, 1943 |
| 2,418,538 | Yetter | Apr. 8, 1947 |
| 2,484,623 | Heising | Oct. 11, 1949 |
| 2,507,121 | Sivian | May 9, 1950 |

OTHER REFERENCES

Article: Pages 1531–41 "Institute of Radio Engineers," vol. 25, No. 12—Dec. 1937.